(12) United States Patent
Nakhmanovich

(10) Patent No.: US 11,346,000 B2
(45) Date of Patent: May 31, 2022

(54) METHOD FOR PATTERNING A METAL ON A SUBSTRATE AND ARTICLES COMPRISING SAME

(71) Applicant: SCODIX LTD., Rosh HaAyin (IL)

(72) Inventor: Gregory Nakhmanovich, Oranit (IL)

(73) Assignee: SCODIX LTD., Rosh Haayin (IL)

( * ) Notice: Subject to any disclaimer, the term of this patent is extended or adjusted under 35 U.S.C. 154(b) by 0 days.

(21) Appl. No.: 16/701,888

(22) Filed: Dec. 3, 2019

(65) Prior Publication Data
US 2021/0164105 A1    Jun. 3, 2021

(51) Int. Cl.
| | | |
|---|---|---|
| C23C 18/14 | (2006.01) | |
| C09D 11/107 | (2014.01) | |
| C09D 11/101 | (2014.01) | |
| C09D 11/38 | (2014.01) | |

(52) U.S. Cl.
CPC .......... *C23C 18/143* (2019.05); *C09D 11/101* (2013.01); *C09D 11/107* (2013.01); *C09D 11/38* (2013.01)

(58) Field of Classification Search
CPC ... C23C 18/143; C09D 11/101; C09D 11/107; C09D 11/38
See application file for complete search history.

(56) References Cited

U.S. PATENT DOCUMENTS

| | | |
|---|---|---|
| 3,930,963 A | 1/1976 | Polichette |
| 5,751,325 A | 5/1998 | Leenders et al. |
| 8,435,603 B2 * | 5/2013 | Bentley .................. C23C 18/30 427/333 |
| 2006/0134318 A1 | 6/2006 | Hudd |
| 2008/0308001 A1 | 12/2008 | Okada |
| 2016/0032459 A1 * | 2/2016 | Behl ..................... C04B 41/009 427/372.2 |

FOREIGN PATENT DOCUMENTS

| | | |
|---|---|---|
| DE | 102013016280 A1 | 4/2015 |
| EP | 1846518 A1 | 10/2007 |
| WO | 9829579 A1 | 7/1998 |
| WO | 2005045095 A2 | 5/2005 |
| WO | 2005056875 A2 | 6/2005 |

OTHER PUBLICATIONS

Gentry et al. "Controlled Particle Growth of Silver Sols through the Use of Hydroquinone as a Selective Reducing Agent" Langmuir 2009, 25, 2613-2621. (Year: 2009).*
Fundamentals of Inkjet Printing: The Science of Inkjet and Droplets edited by Hoath (Year: 2016).*
Sarathi Guin P. et al; "Electrochemical Reduction of Quinones in Different Media: A Review"; International Journal of Electrochemistry; vol. 2011, Article ID 816202, 22 pages, 2010.
Melvin Keith Carter; "Correlation of electronic transitions and redox potentials measured for pyrocatechol, resorcinol, hydroquinone, pyrogallol, and gallic acid with results of semi-empirical molecular orbital computations—A useful interpretation tool"; Journal of Molecular Structure 831 (2007) 26-36.
Anurag Mehra et al: "Color and surface plasmon effects in nanoparticle systems: Case of silver nanoparticles prepared by microemulsion route" Colloids and Surfaces A: Physicochem. Eng. Aspects 404 (2012) 83-92.

* cited by examiner

*Primary Examiner* — Robert S Walters, Jr.
(74) *Attorney, Agent, or Firm* — The Roy Gross Law Firm, LLC; Roy Gross

(57) ABSTRACT

A method for patterning a metal layer on a substrate is disclosed. Furthermore, a kit comprising a first composition comprising a reducing agent and a second composition comprising a metal salt, and an article comprising a substrate in contact with a metal layer are also disclosed.

20 Claims, No Drawings

METHOD FOR PATTERNING A METAL ON A SUBSTRATE AND ARTICLES COMPRISING SAME

FIELD OF THE INVENTION

The invention relates generally to the field of forming a patterned metal film on a substrate.

BACKGROUND OF THE INVENTION

The process of patterning a metal on a substrate has various limitations. The conventional printing technique utilizes a printing press, which prints the nonmetallic colors and then utilizes foils comprising a metallic layer to generate a glossy surface having a metallic appearance. Such foils can be polymeric foils having a metal layer incorporated within. Usually, such foils contain metals such as aluminum or copper and further contain an elastic polymer (e.g. a polyester) to provide a support for the abovementioned metallic layer. Usually, the process of printing metallic pattern a colored substrate comprises two printing stages. The first printing stage is configured to conduct the nonmetallic printing. The nonmetallic printing provides the nonmetallic colors on the areas of the substrate resulting in colored pattern on the substrate. The second printing stage is configured to utilize the foil coated with a metallic layer to print the metallic pattern on the substrate.

Utilizing polymer-based metal foils in such a printing process has several challenges. First, it is a time-consuming process, since the printing process requires two stages. Additionally, once the foil is utilized in the printing process it has to be discarded, thereby wasting the residual metallic and plastic materials and generating a substantial amount of hazardous non-biodegradable waste. Therefore, there is a need to develop an environmentally friendly and cost-efficient process for patterning a metallic layer on a substrate, in order to reduce production costs and to minimize hazardous waste accumulation.

The foregoing examples of the related art and limitations related therewith are intended to be illustrative and not exclusive. Other limitations of the related art will become apparent to those of skill in the art upon a reading of the specification.

SUMMARY OF THE INVENTION

The following embodiments and aspects thereof are described and illustrated in conjunction with systems, tools and methods which are meant to be exemplary and illustrative, not limiting in scope.

In one aspect of the invention described herein, there is a method for patterning a metal layer on a substrate, comprising: (i) providing a substrate in contact with a cured composition comprising a reducing agent; (ii) contacting the cured composition with a second composition comprising (a) a solvent, and (b) a metal cation reducible by the reducing agent, under conditions sufficient for reduction of the metal cation, wherein the conditions comprise exposure to UV-light; thereby patterning a metal layer on the substrate.

In one embodiment, conditions comprise a temperature between 25 to 250° C.

In one embodiment, the UV-light comprises light at a wavelength between 150 to 350 nm.

In one embodiment, contacting is by a process selected from the group consisting of: printing, digital printing, spray printing, flexography, ink jet printing, spin casting, spin coating, spray coating, and dip coating or any combination thereof.

In one embodiment, the second composition has a viscosity between 1 and 100 cP.

In one embodiment, the cured composition comprises at least partially cross-linked UV-curable compound.

In one embodiment, the UV-curable compound comprises an unsaturated bond.

In one embodiment, the UV-curable compound comprises an acrylate-based compound, a vinyl-based compound or both.

In one embodiment, the acrylate-based compound is selected from the group consisting of: epoxyacrylates, urethanacrylates, and polyesteracrylates, or any combination thereof.

In one embodiment, the reducing agent is selected from the group consisting of: sodium tetrahydroborate, citric acid, ascorbic acid, formic acid, hydrazine, dihydroxybenzene, catechol, resorcinol, hydroquinone, methylhydroquinone, tert-butylhydroquinone, di-tert-butylhydroquinone, ubiquinol, an aminophenol, and a phenylenediamine including any combinations, salts or derivatives thereof.

In one embodiment, the reducing agent comprises a dihydroxybenzene or a derivative thereof.

In one embodiment, the reducing agent comprises hydroquinone or a derivative thereof.

In one embodiment, the metal is selected from the group consisting of: silver (Ag), gold (Au), palladium (Pd), platinum (Pt), copper (Cu), rhodium (Rh) tungsten (W), titanium (Ti), zirconium (Zr), hafnium (Hf), tin (Sn), gallium (Ga), molybdenum (Mo), vanadium (V), tantalum (Ta), germanium (Ge) and Niobium (Nb) or any combination thereof.

In one embodiment, the substrate in contact with the cured composition is manufactured by: (i) contacting a substrate with a first composition comprising the reducing agent and the UV-curable compound, to obtain the substrate in contact with the first composition; and (ii) exposing the substrate to UV-light, thereby curing the first composition.

In one embodiment, any of the first composition and the second composition further comprise a photoinitiator, a colorant, and a binder or any combination thereof.

In one embodiment, the second composition further comprises a UV-curable compound, a binder, a catalyst or any combination thereof.

In one embodiment, the method further comprises step (iv) of contacting the metal layer or the substrate with a polymeric material, thereby forming an additional layer.

In one embodiment, the metal layer is between 0.1 to 100 nm thick.

In one embodiment, the metal layer is characterized by a gloss greater than 400 GU, when measured according to ISO 2813.

In addition to the exemplary aspects and embodiments described above, further aspects and embodiments will become apparent by study of the following detailed description.

DETAILED DESCRIPTION OF THE INVENTION

In one aspect of the invention disclosed herein, there is a kit comprising a) a first composition having a viscosity of 10 to 100 cP at a temperature of 25° C., the first composition comprising (i) a reducing agent and (ii) a curable compound, a polymerizable compound, or any combination thereof; and b) a second composition comprising a metal cation, wherein the metal cation is reducible by the reducing agent.

In another aspect of the invention, there is a method for patterning a metal layer on a substrate, comprising (i) providing a substrate in contact with a cured composition comprising a reducing agent; (ii) contacting the cured composition with a second composition comprising (a) a solvent, and (b) a metal cation reducible by the reducing agent, under conditions sufficient for reduction of the metal cation, thereby patterning a metal layer on the substrate.

The present invention is directed in some embodiments thereof, to an industrially applicable reliable and efficient process of printing a metal layer on a substrate, thereby resulting in a reflective surface characterized by a gloss level of at least 400 GU (wherein the gloss level is measured as described hereinbelow).

The present invention is also based, in part, on a finding that a composition comprising a reducing agent (e.g. dihydroxybenzene) is capable of reducing a metal cation in contact therewith, under conditions comprising inter alia exposure to UV-radiation.

Reducing Agent

In some embodiments, a reducing agent is able to reduce a metal cation, wherein the metal cation is as described hereinbelow. In some embodiments, a reducing agent is able to reduce a metal cation to its elemental state. In some embodiments, the reducing agent reduces a metal cation upon contacting therewith. In some embodiments, the reducing agent reduces a metal cation in solution. In some embodiments, the reducing agent reduces a metal cation in a semiliquid state (e.g. dispersed within a gel). In some embodiments, the reducing agent reduces a metal cation upon contacting with a second composition, wherein the second composition is as described hereinbelow.

In some embodiments, the reducing agent has a standard reduction potential (also referred to herein as "redox potential") lower than a redox potential of a metal cation. In some embodiments, the reducing agent has a redox potential in a range from +0.7 to −1.5 V, from +0.4 to −1.0 V, from +0.5 to −1.0 V, from +0.2 to +0.8 V, from +0.5 to +0.8 V, from +0.6 to +0.8 V, from +0.5 to −1.0 V, from +0 to −1.0 V, from +0.3 to −0.8 V, from +0 to −0.8 V, from −0.1 to −0.9 V, from −0.2 to −1.5 V, from −0.2 to −0.8 V, from −0.2 to −1.0 V, from −0.4 to −0.8 V, from −0.5 to −0.8 V, from −0.6 to −0.8 V, including any range or value therebetween.

In some embodiments, the reducing agent has a redox potential at least 0.1 V lower than a redox potential of the metal cation. In some embodiments, the reducing agent has a redox potential at least 0.01 V, at least 0.05 V, at least 0.1 V, at least 0.2 V, at least 0.3 V, at least 0.4 V, at least 0.5 V, at least 0.6 V, at least 0.7 V, at least 0.8 V, at least 0.9 V, at least 1 V, at least 1.2 V lower than a redox potential of the metal cation.

In some embodiments, the reducing agent has a solubility within a first composition at a temperature between 15 and 30° C. greater than 5 g/L. In some embodiments, the reducing agent has a solubility in a first composition greater than 10 g/L. In some embodiments, the reducing agent has a solubility in a first composition greater than 15 g/L. In some embodiments, the reducing agent has a solubility in a first composition greater than 25 g/L. In some embodiments, the reducing agent has a solubility in a first composition greater than 50 g/L. In some embodiments, the reducing agent has a solubility in a first composition greater than 100 g/L. In some embodiments, the reducing agent has a solubility in a first composition greater than 150 g/L. In some embodiments, the reducing agent has a solubility in a first composition greater than 200 g/L. In some embodiments, the reducing agent has a solubility in a first composition greater than 250 g/L, wherein the first composition is as described hereinbelow.

Non-limiting examples of reducing agents include but are not limited to: a salt of tetrahydroborate (such as Na-, or Li-salt), hypophosphite salt, dimethylamine borane, $LiAlH_4$, a salt of cyanoborohydride (such as $NaCNBH_3$), diisobutylaluminium hydride, citric acid, ascorbic acid, formic acid, hydrazine, dihydroxybenzene, catechol, resorcinol, hydroquinone, methylhydroquinone, tert-butylhydroquinone, di-tert-butylhydroquinone, ubiquinol, 1-phenyl-3-pyrazolidinone, an aminophenol (such as metol), and a phenylenediamine including any combinations, salts or derivatives thereof.

In some embodiments, the reducing agent comprises one or more compounds. In some embodiments, the reducing agent comprises one or more compounds comprising dihydroxybenzene or a derivative thereof.

Non-limiting examples of dihydroxybenzene or derivatives thereof include but are not limited to: dihydroxybenzenes or derivative thereof (such as catechol, resorcinol, hydroquinone, methylhydroquinone, tert-butylhydroquinone, di-tert-butylhydroquinone, ubiquinol), dihydroxybenzene-based fused aromatic rings (such as 9,10 dihydroxyanthracene, including any additional ring substituent, dihydroxynaphtalene including any derivative thereof), amino-substituted aromatic ring (such as an ortho-, meta, or para-aminophenol, ortho-, meta-, or para-phenylenediamine) including any combinations, salts or derivatives thereof.

In some embodiments, the reducing agent is hydroquinone, or any ring-substituted derivative thereof.

Metal Cation

In some embodiments, the second composition comprises a salt. In some embodiments, the second composition comprises a metal salt. In some embodiments, the salt comprises a metal cation. In some embodiments, the second composition comprises a metal cation. In some embodiments, a w/w concentration of a metal cation within the second composition is at a range from 0.5 to 40%, from 1 to 40%, from 1 to 10%, from 1 to 5%, from 2 to 5%, from 2 to 10%, from 3 to 10%, from 3 to 7%, from 3 to 5%, from 5 to 20%, from 5 to 10%, from 5 to 15%, from 10 to 15%, from 12 to 18%, from 13 to 16%, from 10 to 20%, from 12 to 20%, from 15 to 20%, including any range or value therebetween.

In some embodiments, a molar concentration of a metal cation within the second composition is at a range from 0.1 to 10 M, from 0.1 to 5 M, from 0.1 to 3 M, from 0.3 to 5 M, from 0.3 to 4 M, from 0.3 to 3 M, from 0.3 to 2 M, from 0.3 to 1 M, from 0.3 to 0.8 M, from 0.3 to 0.7 M, from 0.3 to 0.6 M, from 5 to 10 M, from 3 to 10 M, from 2 to 5 M, from 0.4 to 1 M, from 0.4 to 2 M, from 0.4 to 0.6 M, including any range or value therebetween.

In some embodiments, the metal cation is reducible by the reducing agent, as described hereinabove. In some embodiments, the metal cation is reducible to its elemental state by the reducing agent. In some embodiments, a redox potential of the metal cation is greater than a redox potential of the reducing agent.

In some embodiments, the metal cation has a redox potential of at least +0.2 V, at least +0.5 V, at least +0.7 V, at least +0.9 V, at least +1.2 V, at least +1.5 V, at least +1.7 V, at least +1.9 V, at least +2 V, including any range or value therebetween.

In some embodiments, the metal cation has a redox potential of at least 0.01 V, at least 0.05 V, at least 0.1 V, at least 0.2 V, at least 0.3 V, at least 0.4 V, at least 0.5 V, at least 0.6 V, at least 0.7 V, at least 0.8 V, at least 0.9 V, at least 1 V, at least 1.2 V greater than a redox potential of the reducing agent.

In some embodiments, the metal cation is any of a monovalent-, a divalent-, a trivalent cation or any combination thereof.

Non-limiting examples of metal cations include but are not limited to: $Au^+$, $Cu^+$, $Ag^+$, $Pd^{2+}$, $Rh^+$, $Rh^{3+}$, $Pt^{2+}$, $Al^{3+}$, $Zn^{2+}$, $Ni^{2+}$, $Co^{2+}$ or any combination thereof.

Non-limiting examples of anions include but are not limited to: halogenides (chlorides, bromides, fluorides, and iodides), sulfate, sulfite, nitrate, acetate, carbonate, citrate, and phosphate or any combination thereof.

Non-limiting examples of metal salts include but are not limited to: $AuCl_3$, $Cu(NO_3)_2$, $AgCl$, $AgNO_3$, $AgBr$, $PdCl_2$, $PtBr_2$, $Al(OH)_3$, $ZnCl_2$ or any combination thereof.

In some embodiments, the metal salt comprises the metal cation and an anion.

In some embodiments, the metal cation is in a form of a metal or coordinative complex. Non-limiting examples of coordinative complexes include but are not limited to: $[CoCl_2(NH_3)_4]^+$, $[Cu(CN)_2]^-$, $[PtCl_4]^{2-}$, $[PdCl_6]^{2-}$, $[Ag(CH_3CN)_4]^-$, $[Ag(NH_3)_2]^+$, or any combination thereof.

Alternatively, the metal cation may be encapsulated into a nanoparticle.

In some embodiments, the metal cation is bound to a crown-ether. Non-limiting examples of crown ethers include but are not limited to: 12-crown-4, 15-crown-5, 18-crown-6, dibenzo-18-crown-6, and diaza-18-crown-6 or any combination thereof.

In some embodiments, the metal salt is a silver salt. Non-limiting examples of silver salts include but are not limited to: $AgCl$, $AgNO_3$, $AgBr$, $AgI$, $Ag_2CO_3$, silver triflate, $AgClO_4$, silver acetate, silver trifluoroacetate, silver lactate, silver sulfate, silver tetrafluoroborate, silver nitrite, silver cyanide, silver hexafluorophosphate, silver neodecanoate, or any combination thereof.

In some embodiments, the metal salt is soluble in a second solvent, as described hereinbelow. In some embodiments, the metal salt is soluble in an aqueous solvent.

In some embodiments, the metal salt has a solubility in an aqueous solvent at a temperature between 15 and 30° C. greater than 5 g/L. In some embodiments, the metal salt has a solubility in an aqueous solvent greater than 10 g/L. In some embodiments, the metal salt has a solubility in an aqueous solvent greater than 15 g/L. In some embodiments, the metal salt has a solubility in an aqueous solvent greater than 25 g/L. In some embodiments, the metal salt has a solubility in an aqueous solvent greater than 50 g/L. In some embodiments, the metal salt has a solubility in an aqueous solvent greater than 100 g/L. In some embodiments, the metal salt has a solubility in an aqueous solvent greater than 150 g/L. In some embodiments, the metal salt has a solubility in an aqueous solvent greater than 200 g/L. In some embodiments, the metal salt has a solubility in an aqueous solvent greater than 250 g/L.

Curable or Polymerizable Compound

In some embodiments, a curable compound is referred to a compound which hardens upon curing. In some embodiments, a curable compound forms cross-links upon curing. In some embodiments, curing induces cross-linking of the curable compound. In some embodiments, curing, as used herein comprises any of thermal curing, UV/visible light curing or both. In some embodiments, the curable compound is a thermosetting polymer.

Non-limiting examples of thermosetting polymers include but are not limited to: epoxy resins, silicone resins, polyester resins, polyurethanes, or any combination thereof.

As used herein the term "curing" refers to hardening of a polymeric material by crosslinking of polymeric chain. In some embodiments, curing comprises solidifying a liquid composition or a composition in a molten state. Such crosslinking may result in the formation of a tridimensional polymeric network. In some embodiments, a thermal curing induces or initiates thermal cross-linking of the curable compound. In some embodiments, a thermal curing induces or initiates a nucleophilic inter-, or intra-molecular reaction, resulting in a cross-linking of the curable compound. In some embodiments, a nucleophilic reaction is initiated by cationic or anionic catalysis. In some embodiments, curing refers to UV-induced crosslinking of the unsaturated moieties, such as carbon-carbon double bonds.

Polymerization or curing can be induced or initiated in any manner, such as for instance, irradiating with electromagnetic radiation having sufficient energy to initiate a polymerization or a cross-linking reaction. In some embodiments, curing induces a polymerization of the polymerizable compound. In some embodiments, a polymerization of the polymerizable compound is induced by any of a thermal curing, a UV/visible light curing or both.

In some embodiments, curing or polymerizing is by exposing the curable compound or the polymerizable compound to UV-vis radiation. In some embodiments, the curable compound is a UV-curable compound. In some embodiments, the polymerizable compound is a UV-polymerizable compound. In some embodiments, a UV-curable compound comprises a UV-cross-linkable bond. In some embodiments, a UV-cross-linkable bond is any bond that reacts upon exposure to UV-vis radiation. In some embodiments, a UV-cross-linkable bond reacts upon exposure to UV-vis radiation, so as to form an intramolecular or an intermolecular cross-link.

In some embodiments, the UV-curable or the UV-polymerizable compound refers to a composition comprising at least one of: a monomer, an oligomer, a polymer or a mixture thereof, wherein the composition is at least partially polymerizable (e.g. via a free-radical polymerization) or curable upon exposure to light in the UV and/or visible spectral range.

In some embodiments, the UV-curable compound or the UV-polymerizable compound comprises a monomeric chemical species, such as a chemical species having one or more functional groups or moieties that can react with the same or different functional groups or moieties of another monomeric chemical species to form one or more covalent bonds, such as in a polymerization reaction. A UV-induced polymerization reaction, in some embodiments thereof, comprises a free radical polymerization.

In some embodiments, the UV-curable compound or the UV-polymerizable compound comprise a UV-reactive functional group. Non-limiting examples of UV-reactive functional groups include but are not limited to: an unsaturated bond, an amine, a thiol, a hydroxy, a carboxylic acid derivative, a diene, a tetrazine, a halogen, an azide, succinic anhydride, an α,β unsaturated carbonyl or any combination thereof.

In some embodiments, the UV-curable compound or the UV-polymerizable compound comprise a compound having a first UV-reactive functional group, and an additional compound having a second UV-reactive functional group.

In some embodiments, the UV-curable compound or the UV-polymerizable compound comprise an unsaturated bond. Non-limiting examples of unsaturated bonds include but are not limited to: carbon-carbon double bond, nitrogen-nitrogen double bond, carbon-carbon triple bond, sulfoxide bond, a nitrile bond, an imine bond, or any combination thereof. In some embodiments, the unsaturated bond is an $\alpha,\beta$ unsaturated bond (such as an $\alpha,\beta$ unsaturated carbonyl group, or $\alpha,\beta$ unsaturated carboxyl group).

In some embodiments, the UV-curable compound or the UV-polymerizable compound comprise a photopolymer. As used herein, the term "photopolymer" refers to a photo-polymerizable molecule being in form of a monomer, an oligomer, a polymer, or a mixture thereof. In one exemplary embodiment, the photo-polymerizable molecule comprises a photo-polymerizable unsaturated moiety (e.g. a vinyl group or an allyl group). In some embodiments, the photo-polymerizable molecule is photo-polymerizable or photo-curable at wavelengths ranging from about 150 nm to about 400 nm. Alternatively, the photo-polymerizable molecule is photo-polymerizable at visible wavelengths of the electromagnetic spectrum.

Non-limiting examples of photo-polymerizable molecules comprise: styrene, N-Vinylpyrrolidone, allyl acrylate, diacrylates (such as epoxides, urethanes, ethers, or esters functionalized by acrylate), tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, tridecyl methacrylate, tri(meth)acrylates (e.g., 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, and/or tris(2-hydroxy ethyl) isocyanurate triacrylate) or any combination thereof.

In some embodiments, the UV-curable compound comprises an acrylate-based compound, a vinyl-based compound or a combination thereof. In some embodiments, the UV-curable compound comprises one or more low molecular weight materials, such as methacrylates, dimethacrylates, triacrylates, and diacrylates, or any combination thereof.

Non-limiting examples of acrylate-based compounds include but are not limited to: epoxyacrylates, urethanacrylates, and polyesteracrylates, or any combination thereof.

In some embodiments, the UV-curable compound comprises an acrylate-based compound as specified in the Examples section.

In some embodiments, the UV-curable compound or the UV-polymerizable compound has a solubility in a second solvent at a temperature between 15 and 30° C. greater than 5 g/L, greater than 10 g/L, greater than 15 g/L, greater than 25 g/L including any range or value therebetween.

Binder

As used herein, the term "binder" refers to a substance which binds or adheres one or more components of the composition to the substrate. In some embodiments, a binder induces binding or adhesion of a composition to the substrate. In some embodiments, a binder increases a viscosity of a composition comprising same. In some embodiments, a composition comprising a binder is characterized by a predefined viscosity. In some embodiments, a composition comprising a binder is characterized by a viscosity sufficient for binding or adhesion to the substrate.

In some embodiments, a binder is soluble in a first composition or within a second composition. In some embodiments, a binder is soluble in an aqueous solvent. In some embodiments, a binder is soluble in an organic solvent. In some embodiments, the binder has a solubility within a first solvent or within a second solvent greater than 5 g/L, greater than 10 g/L, greater than 15 g/L, greater than 25 g/L including any range or value therebetween.

In some embodiments, a binder comprises any of a thermoplastic polymer, a thermosensitive polymer, reactive polyvinyl alcohol (PVA) (such as acetoacetyl modified PVA), cationically modified PVA (such as amine or ammonium modified PVA), anionically modified PVA, hydrophilic group modified PVA, polyethylene oxide (PEO), PVA-co-polymer PEO, a silicate-based binder and a starch-based binder, or any combination thereof.

In some embodiments, a binder comprises a thermoresponsive polymer, wherein the thermoresponsive polymer is characterized by a gel transition temperature (Tgel).

First Composition

In some embodiments, the first composition is a solid composition. In some embodiments, the first composition is in a solid form at a temperature below 25° C., below 20° C., below 15° C., below 10° C., including any range or value therebetween. In some embodiments, the first composition is meltable at a temperature ranging from 25 to 80° C., from 25 to 30° C., from 30 to 80° C., from 25 to 50° C., from 30 to 50° C., from 40 to 60° C., from 40 to 70° C., from 30 to 70° C., including any range or value therebetween.

In some embodiments, the first composition is a flowable composition. In some embodiments, the first composition is flowable in a molten state. In some embodiments, the first composition is flowable at a temperature ranging from 10 to 80° C., from 10 to 30° C., from 30 to 80° C., from 20 to 50° C., from 30 to 50° C., from 40 to 60° C., from 40 to 70° C., from 30 to 70° C., including any range or value therebetween.

In some embodiments, the first composition is a semi-solid composition. In some embodiments, the first composition is a semi-liquid composition.

In some embodiments, the first composition is a liquid composition. In some embodiments, the first composition in liquid state is referred to as an uncured composition. In some embodiments, the first composition is a liquid at a temperature ranging from 10 to 50° C., from 10 to 30° C., from 10 to 40° C., from 20 to 30° C., from 20 to 40° C., from 30 to 50° C., from 20 to 50° C., from 35 to 50° C., including any range or value therebetween. In some embodiments, the first composition is substantially devoid of any particulate matter. In some embodiments, the first composition is substantially homogenous, wherein substantially is as described hereinbelow. In some embodiments, the first composition is devoid of a solvent.

In some embodiments, the first composition is a solution. In some embodiments, the first composition is an emulsion. In some embodiments, the first composition is a dispersion.

In some embodiments, the first composition comprises (i) a reducing agent and (ii) at least one of a curable compound, a polymerizable compound, and a binder or any combination thereof. In some embodiments, the first composition comprises (i) the reducing agent and (ii) the curable compound, or the polymerizable compound. In some embodiments, the first composition comprises (i) the reducing agent and (ii) the UV-curable compound, or the UV-polymerizable compound. In some embodiments, the first composition comprises (i) the reducing agent, (ii) the UV-curable compound, or the UV-polymerizable compound and (iii) a photoinitiator. In some embodiments, the first composition comprises (i) the reducing agent, (ii) the UV-curable compound, and optionally at least one of a colorant, a surfactant and a photoinitiator.

In some embodiments, the first composition comprises the reducing agent, wherein the reducing agent is as described hereinabove. In some embodiments, the first composition comprises the reducing agent at a weight per weight (w/w) concentration in a range from 0.5 to 20%, from 1 to 20%, from 1 to 10%, from 1 to 5%, from 2 to 5%, from 2 to 10%, from 3 to 10%, from 3 to 7%, from 3 to 5%, from 5 to 20%, from 5 to 10%, from 5 to 15%, from 10 to 15%, from 10 to 20%, from 12 to 20%, from 15 to 20%, including any range or value therebetween.

In some embodiments, the first composition comprises the reducing agent at a molar concentration in a range from 0.1 to 10 M, from 0.5 to 1.2 M, from 0.5 to 1.1 M, from 0.1 to 1.5 M, from 0.2 to 1.5 M, from 2 to 8 M, from 3 to 10 M, from 3 to 7 M, from 3 to 5 M, from 0.5 to 2 M, from 0.7 to 1.3 M, from 0.8 to 1.2 M, including any range or value therebetween.

In some embodiments, the reducing agent is dissolved or dispersed within the first composition. In some embodiments, the reducing agent is dissolvable or dispersible within the first composition. In some embodiments, the reducing agent is dissolvable or dispersible within the first composition comprising a curable or a polymerizable compound and a surfactant. In some embodiments, the reducing agent is dissolvable or dispersible within an emulsion comprising the first composition.

In some embodiments, a w/w concentration of the curable compound, within the first composition is at a range from 50 to 60%, from 50 to 80%, from 60 to 80%, from 60 to 90%, from 50 to 95%, from 70 to 90%, from 70 to 95%, from 80 to 90%, from 80 to 95%, from 90 to 95%, including any range or value therebetween.

In some embodiments, the first composition further comprises an additive, wherein the additive comprises any of a colorant, a surfactant or a mixture thereof In some embodiments, the first composition comprises (i) the reducing agent, (ii) the binder and optionally (iii) a first solvent. In some embodiments, the first composition comprises (i) the reducing agent, (ii) the binder, (iii) the first solvent, and optionally the additive.

In some embodiments, the first composition is characterized by a viscosity in a range from 2 to 100 cP, from 10 to 100 cP, from 20 to 100 cP, from 20 to 60 cP, from 20 to 50 cP, from 20 to 70 cP, from 30 to 50 cP, from 20 to 40 cP, including any range or value therebetween.

In some embodiments, the first composition is characterized by a viscosity sufficient for binding or adhesion to the substrate. In some embodiments, the viscosity is sufficient to allow forming a pattern (e.g. the first pattern) on the substrate. In some embodiments, the first composition is characterized by a viscosity sufficient to form a stable pattern (e.g. the first pattern) on the surface. In some embodiments, the first composition is characterized by a viscosity sufficient for stabilizing the first pattern on the surface. In some embodiments, the first composition is characterized by a viscosity appropriate for applying the first composition on a substrate by any of the methods described hereinbelow. In some embodiments, the viscosity of the first composition is compatible with any of the printing methods (e.g. ink-jet printing). In some embodiments, the viscosity of the first composition is compatible with an ink-jet printing apparatus.

In some embodiments, the first pattern is stable for at least 0.01 s, at least 0.1 s, at least 0.5 s, at least 0.8 s, at least 1 s, at least 1.5 s, at least 2 s, at least 3 s, at least 10 s, at least 1 minute (min), at least 2 min, at least 5 min, at least 10 min, at least 20 min, including any range or value therebetween.

In some embodiments, the first pattern is stable for less than 20 min, less than 10 min, less than 5 min, less than 1 min, less than 40 s, less than 20 s, less than 10 s, less than 5 s, less than 2 s, including any range or value therebetween.

In some embodiments, the first pattern is referred to as stable, if it pertains at least 80%, at least 85%, at least 90%, at least 95%, at least 97% of its structure when applied to the surface. In some embodiments, the viscosity of the second composition is sufficient to substantially prevent spreading of the second composition on the surface. In some embodiments, substantially prevent comprises less than 25%, less than 20%, less than 15%, less than 10%, less than 8%, less than 5%, less than 3%, less than 1% spreading.

In some embodiments, the first solvent is selected from an aqueous solvent, an organic solvent or any combination thereof. In some embodiments, an organic solvent is selected from a polar organic solvent, a non-polar organic solvent (such as chloroform, dichloromethane, and carbohydrates such as hexane, cyclohexane, methyl-cyclohexane, aromatic solvents such as xylenes, toluene, etc.) or any combination thereof.

In some embodiments, the first solvent is an aqueous solvent. In some embodiments, the first solvent comprises an aqueous solvent and a polar organic solvent. In some embodiments, the first composition is an aqueous composition comprising the first solvent, the reducing agent, and the binder.

Non-limiting examples of aqueous solvents include but are not limited to: an aqueous buffer solution (phosphate buffer, carbonate buffer, acetic buffer etc.,), an aqueous salt solution, and water or any combination thereof.

Non-limiting examples of polar organic solvents include but are not limited to: acetone, an alcohol (such as methanol, ethanol, ethylene glycol, propylene glycol, tert-butanol, propanol, iso-propanol), dimethyl formamide (DMF), N-methylpyrrolidone (NMP), dimethyl sulfoxide (DMSO), acetonitrile, and an ester (such as ethyl acetate, 2-ethoxyethyl acetate or any combination thereof.

In some embodiments, the first composition comprises a surfactant. In some embodiments, the surfactant is appropriate for dispersing the reducing agent within the first solvent or within the first composition. In some embodiments, the surfactant is appropriate for dispersing the reducing agent, the UV-curable compound and optionally an additive within the first solvent or within the first composition. In some embodiments, the surfactant is for improving wettability of the substrate by lowering the surface tension of the first composition.

Non-limiting examples of surfactants include but are not limited to: an anionic surfactant (such as salts of fatty acids such as stearic, oleic, palmitic, and lauric acid), a cationic surfactant (e.g., quaternary ammonium salts such as benzalkonium chloride, benzethonium chloride, and cetylpyridinium chloride), and a non-ionic surfactant (e.g., glyceryl monolinoleate glyceryl monooleate, a polysorbate, a siloxane or block copolymer of siloxanes such as polydimethyl siloxane-co-polymethylvinylsiloxane) or any combination thereof.

In some embodiments, the surfactant is a non-ionic surfactant.

In some embodiments, a w/w concentration of the surfactant within the first composition at in a range from 0.1 to 20%, from 0.1 to 0.5%, from 0.1 to 5%, from 1 to 7%, from 0.5 to 2%, from 1 to 20%, from 1 to 10%, from 1 to 5%, from 2 to 5%, from 2 to 10%, from 3 to 10%, from 3 to 7%, from 3 to 5%, from 5 to 20%, from 5 to 10%, from 5 to 15%, from 10 to 15%, from 10 to 20%, from 12 to 20%, from 15 to 20%, including any range or value therebetween.

In some embodiments, the first composition comprises a photoinitiator. In some embodiments, a photoinitiator comprises an alpha-hydroxy ketone, an alpha-amino ketone, a phosphineoxide, or any combination thereof. In some embodiments, the photoinitiator is an alpha-cleavage type (unimolecular decomposition process) photoinitiator or a hydrogen abstraction photosensitizer-tertiary amine synergist, operable to absorb UV light, preferably between 150 nm and 400 nm, between 200 and 280 nm, between 220 and 280 nm, between 220 and 300 nm, or between 300 nm and 385 nm, to yield free radical(s) thereby catalyzing the UV-induced curing or polymerization.

Non-limiting examples of photoinitiators include but are not limited to: diphenyl(2,4,6-trimethylbenzoyl)phosphine oxide, 1-hydroxycyclohexyl phenyl ketone, phenyl bis(2,4,6-trimethylbenzoyl)phosphine oxide, 4'-ethoxyacetophenone, 3'-hydroxyacetophenone, and 2-hydroxy-4'-(2-hydroxyethoxy)-2-methylpropiophenone or any combination thereof.

In some embodiments, the first composition comprises a colorant. Non-limiting examples of colorants include but are not limited to: zinc sulfide, carbon black, iron oxides, quinacridone, cadmium sulfoselenide, cadmium sulfide, lead chromate, azo dyes, chrome (III) oxide, titanium dioxide, phtalocyanine, or any combination thereof.

In some embodiments, the first composition is stable upon storage. In some embodiments, the first composition is stable at a temperature between 0 and 60° C. for at least 1 month, at least 2 months, at least 3 months, at least 5 months, at least 8 months, at least 10 month, at least 1 year, at least 2 years including any range or value therebetween.

In some embodiments, a stable composition substantially maintains its chemical content and physical properties, wherein substantially is as described hereinabove.

In some embodiments, the first composition is devoid of an amine sensitizer.

Second Composition

In some embodiments, the second composition is a solid composition. In some embodiments, the second composition is in a solid form at a temperature below 25° C., below 20° C., below 15° C., below 10° C., including any range or value therebetween. In some embodiments, the second composition is meltable at a temperature ranging from 25 to 80° C., from 25 to 30° C., from 30 to 80° C., from 25 to 50° C., from 30 to 50° C., from 40 to 60° C., from 40 to 70° C., from 30 to 70° C., including any range or value therebetween.

In some embodiments, the second composition is a flowable composition. In some embodiments, the second composition is flowable in a molten state. In some embodiments, the second composition is flowable at a temperature ranging from 10 to 80° C., from 10 to 30° C., from 30 to 80° C., from 20 to 50° C., from 30 to 50° C., from 40 to 60° C., from 40 to 70° C., from 30 to 70° C., including any range or value therebetween.

In some embodiments, the second composition is a semi-solid composition. In some embodiments, the second composition is a semi-liquid composition.

In some embodiments, the second composition is a liquid composition. In some embodiments, the second composition is a liquid at a temperature ranging from 10 to 50° C., from 10 to 30° C., from 10 to 40° C., from 20 to 30° C., from 20 to 40° C., from 30 to 50° C., from 20 to 50° C., from 35 to 50° C., including any range or value therebetween. In some embodiments, the second composition is substantially devoid of any particulate matter. In some embodiments, the second composition is substantially homogenous, wherein substantially is as described hereinbelow.

In some embodiments, the second composition is a solution. In some embodiments, the second composition is an emulsion. In some embodiments, the second composition is a dispersion.

In some embodiments, the second composition comprises a metal cation, wherein the metal cation is as described hereinabove. In some embodiments, the second composition comprises a metal salt, wherein the metal salt is as described hereinabove.

In some embodiments, a w/w concentration of the metal cation within the second composition is in a range from 0.5 to 40%, from 1 to 40%, from 1 to 10%, from 1 to 5%, from 2 to 5%, from 2 to 10%, from 3 to 10%, from 3 to 7%, from 3 to 5%, from 5 to 20%, from 5 to 10%, from 5 to 15%, from 10 to 15%, from 10 to 20%, from 12 to 20%, from 15 to 20%, from 10 to 30%, from 15 to 30%, from 15 to 40%, from 20 to 30%, from 20 to 40%, from 30 to 40%, including any range or value therebetween.

In some embodiments, the metal cation or the metal salt is dissolved or dispersed within the second composition. In some embodiments, the metal cation or the metal salt is dissolvable or dispersible within the second composition. In some embodiments, the metal cation or the metal salt is dissolvable or dispersible within the second composition comprising a second solvent and a surfactant. In some embodiments, the metal cation or the metal salt is dissolvable or dispersible within an emulsion formed by a second solvent and a surfactant.

In some embodiments, the second composition is characterized by a viscosity in a range from 1 to 100 cP, from 1 to 10 cP, from 1 to 8 cP, from 1 to 5 cP, from 5 to 10 cP, from 10 to 15 cP, from 15 to 20 cP, from 20 to 40 cP, from 30 to 50 cP, from 50 to 70 cP, when measured at 25° C., including any range or value therebetween.

In some embodiments, the second composition is characterized by a pH value in a range between 3 and 8, between 4 and 8, between 5 and 8, between 5 and 7.5, between 5 and 7, between 6 and 8, between 6 and 7, including any range or value therebetween.

In some embodiments, the second composition is characterized by a viscosity sufficient for binding or adhesion to a surface. In some embodiments, the surface comprises the first composition, the cured composition, the substrate or any combination thereof. In some embodiments, the second composition is characterized by a viscosity sufficient to form a stable pattern (e.g. the second pattern) on the surface. In some embodiments, the second composition is characterized by a viscosity sufficient for stabilizing the second pattern on the surface. In some embodiments, the second composition is compatible with a printing apparatus (such as an ink-jet printing apparatus).

In some embodiments, the second pattern is stable for at least 0.01 s, at least 0.1 s, at least 0.5 s, at least 0.8 s, at least 1 s, at least 1.5 s, at least 2 s, at least 3 s, at least 10 s, at least 1 minute (min), at least 2 min, at least 5 min, at least 10 min, at least 20 min, including any range or value therebetween.

In some embodiments, the second pattern is stable for less than 20 min, less than 10 min, less than 5 min, less than 1 min, less than 40 s, less than 20 s, less than 10 s, less than 5 s, less than 2 s, including any range or value therebetween.

In some embodiments, the second pattern is referred to as stable, if it pertains at least 80%, at least 85%, at least 90%, at least 95%, at least 97% of its structure when applied to the surface. In some embodiments, the viscosity of the second composition is sufficient to substantially prevent spreading of the second composition on the surface. In some embodiments, substantially prevent comprises less than 25%, less than 20%, less than 15%, less than 10%, less than 8%, less than 5%, less than 3%, less than 1% spreading.

In some embodiments, the second composition comprises a second solvent selected from an aqueous solvent, an organic solvent or any combination thereof.

In some embodiments, the first composition comprises a solvent selected from an aqueous solvent, an organic solvent or any combination thereof. In some embodiments, an organic solvent is selected from a polar organic solvent, a non-polar organic solvent (such as chloroform, dichloromethane, and carbohydrates such as hexane, cyclohexane, methyl-cyclohexane, aromatic solvents such as xylenes, toluene, etc.) or any combination thereof.

In some embodiments, the solvent is an aqueous solvent. In some embodiments, the solvent comprises an aqueous solvent and a polar organic solvent. In some embodiments, the polar organic solvent is miscible with the aqueous solvent.

Non-limiting examples of aqueous solvents include but are not limited to: an aqueous buffer solution (phosphate buffer, carbonate buffer, acetic buffer etc.,), an aqueous salt solution, and water or any combination thereof.

Non-limiting examples of polar organic solvents include but are not limited to: acetone, an alcohol (such as methanol, ethanol, ethylene glycol, propylene glycol, tert-butanol, propanol, iso-propanol), dimethyl formamide (DMF), N-methylpyrrolidone (NMP), dimethyl sulfoxide (DMSO), acetonitrile, and ethyl acetate or any combination thereof.

In some embodiments, the second solvent is an aqueous solvent. In some embodiments, the second solvent comprises an aqueous solvent and a polar organic solvent, wherein the polar organic solvent is as described hereinabove. In some embodiments, the second solvent comprises an aqueous solvent and an alcohol, wherein the alcohol is as described hereinabove. In some embodiments, the second solvent comprises an aqueous solvent and a diol (e.g. propylene-, or ethylene glycol). In some embodiments, the second solvent is an organic solvent compatible with the metal salt.

In some embodiments, the second composition comprises the second solvent, the metal cation or the metal salt, and optionally comprises at least one of a curable compound, a polymerizable compound, a colorant, a surfactant and a photoinitiator or any mixture thereof. In some embodiments, the second composition further comprises a surfactant, wherein the surfactant is as described hereinabove.

In some embodiments, the second composition comprises the second solvent, the metal cation or the metal salt, and optionally comprises a curable compound or a polymerizable compound wherein the curable compound or the polymerizable compound are as described hereinabove. In some embodiments, the second composition comprises the second solvent, the metal cation or the metal salt, and optionally the UV-curable compound. In some embodiments, the second composition comprises the second solvent, the metal cation or the metal salt, and optionally at least one of the UV-curable compound and a binder, wherein the binder is as described hereinabove.

In some embodiments, the second composition further comprises an additive, wherein the additive is as described hereinabove.

In some embodiments, a w/w concentration of the additive within the first composition at in a range from 0.1 to 20%, from 0.1 to 0.5%, from 0.5 to 2%, from 1 to 20%, from 1 to 10%, from 1 to 5%, from 2 to 5%, from 2 to 10%, from 3 to 10%, from 3 to 7%, from 3 to 5%, from 5 to 20%, from 5 to 10%, from 5 to 15%, from 10 to 15%, from 10 to 20%, from 12 to 20%, from 15 to 20%, including any range or value therebetween. In some embodiments, the second composition comprises an aqueous solvent, and a silver salt. In some embodiments, the second composition comprises an aqueous solvent, a silver salt and a polar organic solvent. In some embodiments, the second composition comprises an aqueous solvent, a silver salt, a polar organic solvent and a silicone-based surfactant. In some embodiments, the second composition comprises silver nitrate, water, a second solvent (e.g. ethylene glycol, propylene glycol or any other water-miscible alcohol) and a silicone-based surfactant (such as polyether-modified siloxane, or silicone polyether acrylate).

In some embodiments, the second composition further comprises a photoinitiator, wherein the photoinitiator is as described hereinabove.

In some embodiments, the second composition further comprises a colorant, wherein the colorant is as described hereinabove. In some embodiments, the second composition is stable upon storage, wherein the stable composition is as described hereinabove. In some embodiments, the second composition is stable at a temperature between 5 and 60° C. for at least 1 month, at least 2 months, at least 3 months, at least 5 months, at least 8 months, at least 10 month, at least 1 year, at least 2 years including any range or value therebetween.

In some embodiments, the second composition is devoid of an amine sensitizer.

Method

In another aspect of the invention provide herein, there is a method for patterning a metal layer on a substrate. In some embodiments, the method is for forming a metal layer on a substrate.

In some embodiments, the method comprises providing a substrate and contacting at least a portion of the substrate with a first composition of the invention. In some embodiments, the method comprises a step (i) of contacting at least a portion of the substrate with the first composition. In some embodiments, the method comprises contacting at least a portion of the substrate with the first composition comprising a reducing agent, to obtain the reducing agent in contact with the substrate. In some embodiments, the reducing agent is in contact with at least a portion of the substrate. In some embodiments, the reducing agent is bound to at least a portion of the substrate. In some embodiments, the reducing agent is adhered to the substrate. In some embodiments, the reducing agent is absorbed to the substrate. In some embodiments, the substrate is impregnated with the reducing agent. In some embodiments, the reducing agent at least partially infiltrates into a porous substrate. In some embodiments, the reducing agent in contact with at least a portion of the substrate forms a layer. In some embodiments, the layer is referred to as a "first layer" as described hereinbelow. In one embodiment, "adhered" comprises "bound". In one embodiment, "in contact" comprises "bound" or "adhered".

In some embodiments, the method comprises contacting at least a portion of the substrate with the first composition, thereby resulting in the first composition in contact with the substrate. In some embodiments, the first composition is in contact with or bound to at least a portion of the substrate. In some embodiments, the first composition is in contact with an outer surface of the substrate. In some embodiments, the first composition is adhered to at least a portion of the substrate. In some embodiments, at least a portion of the substrate is coated by the first composition. In some embodiments, the first composition bound or adhered to at least a portion of the substrate forms a coating layer. In some embodiments, the first composition bound or adhered to at least a portion of the substrate forms a layer. In some embodiments, a layer of the first composition is referred to as a "first layer". In some embodiments, the first layer is as described hereinbelow.

In some embodiments, the first composition is contacted with the substrate by any of the methods described hereinbelow, according to a predetermined pattern. In some embodiments, the predetermined pattern is as described hereinbelow.

In some embodiments, the substrate is a solid at a temperature greater than 10° C., greater than 20° C., greater than 15° C., greater than 25° C., including any range or value therebetween.

In some embodiments, the substrate is a solid at a temperature between 15 and 35° C., between 15 and 35° C., between 15 and 25° C., between 15 and 30° C., between 20 and 35° C., between 20 and 30° C., including any range or value therebetween.

In some embodiments, the substrate comprises a printable substrate selected form the group consisting of: a glass substrate, a metallic substrate, paper-based substrate, a polymeric substrate, a textile substrate, or any combination thereof. In some embodiments, the substrate comprises cellulose, or nitro-cellulose including any derivative thereof.

In some embodiments, the printable substrate has a surface roughness of less than 100 μm, less than 80 μm, less than 50 μm, less than 20 μm, less than 10 μm.

In some embodiments, the method comprises applying or contacting the first composition with at least a portion of the substrate by a process selected from the group consisting of: printing, spin casting, spin coating, spray coating, and dip coating or any combination thereof. In some embodiments, the method comprises contacting the first composition with at least a portion of the substrate by spray coating or dip coating. In some embodiments, the method comprises contacting the first composition with at least a portion of the substrate by printing. In some embodiments, printing is selected from the group consisting of: digital printing, spray printing, flexography, ink jet printing, or any combination thereof.

In some embodiments, the method is for printing a metallic layer on the substrate, wherein the metallic layer is as described hereinbelow.

In some embodiments, any of the first composition or the second composition is contacted with the substrate by digital printing. In some embodiments the first composition or the second composition is contacted with or is deposited on the substrate by dispensing the composition from a dispensing head (also referred to as a "nozzle") of a printing apparatus. In some embodiments, dispensing comprises a predetermined amount (e.g. volume) of the composition. In some embodiments, the nozzle of a printing apparatus is movable in a controlled manner along X and Y axes, so as to enable printing a predetermined pattern on the substrate. In some embodiments, the predetermined pattern is as described hereinbelow. In some embodiments, the predetermined pattern is a two-dimensional (2D) pattern. In some embodiments, the nozzle of a printing apparatus is movable in a controlled manner along X, Y and Z axes, so as to enable printing a predetermined three-dimensional (3D) object on the substrate.

In some embodiments, the movement of the nozzle is under the control of a computer-controlled, CAD/CAM system in which the design of the pattern or of the 3D object to be formed is initially created on a computer. In some embodiments, a software is utilized to translate the 2D or the 3D data in the computer into controlled movement of the nozzle through a predetermined pattern of movement to successively deposit a layer of material according to the desired pattern or shape. In some embodiments, the composition of the invention is deposited on the substrate by ink jet printing. In some embodiments, the method comprises contacting the first composition with at least a portion of the substrate under conditions suitable for printing. In some embodiments, conditions suitable for printing comprise a temperature in a range between 10 and 80° C., between 20 and 60° C., between 25 and 40° C., between 30 and 40° C., between 30 and 50° C., between 25 and 50° C. including any range or value therebetween.

In some embodiments, conditions suitable for printing comprise a contact time ranging from 0.1 to 100 s (seconds), from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, including any range or value therebetween.

In some embodiments, the contact time is less than 5 s, less than 3 s, less than 2 s, less than 1 s, less than 0.5 s, less than 0.1 s, including any range or value therebetween.

In some embodiments, the contact time is sufficient for at least partial binding or adhesion of the first composition to the substrate. In some embodiments, a short contact time is required to prevent spreading of the composition (such as the first composition in a liquid state) on the surface of the substrate, as described hereinabove.

In some embodiments, the method comprises step (ii) of curing the first composition in contact with, bound or adhered to at least a portion of the substrate. In some embodiments, the method comprises step (ii) of curing the first composition, to obtain a cured composition. In some embodiments, the method comprises step (ii) of curing the first composition, to obtain a cured composition bound to at least a portion of the substrate. In some embodiments, step (ii) is for forming substrate in contact with the cured composition. In some embodiments, step (ii) is for patterning the cured composition on the substrate.

In some embodiments, step (ii) of the method comprises curing the curable compound or the polymerizable compound, as described hereinabove. In some embodiments, step (ii) of the method comprises curing the UV-curable compound of the first composition. In some embodiments, curing comprises solidifying of a liquid composition. In some embodiments, curing comprises solidifying of a composition in a molten state.

In some embodiments, curing comprises exposing the uncured composition to electromagnetic radiation (such as UV-radiation, electron beam, X-ray) for a time sufficient for at least partial curing of the composition. In some embodiments, curing comprises a process selected from thermal curing and UV-curing. In some embodiments, curing comprises thermal curing and UV-curing. In some embodiments, thermal curing and UV-curing are performed simultaneously or subsequently.

In some embodiments, curing is as described hereinabove. In some embodiments, thermal curing comprises providing at least a part of the composition to a temperature between 40 and 200° C. In some embodiments, thermal curing comprises drying. In some embodiments, drying comprises a partial drying of the composition. In some embodiments, drying is by evaporating of at least 30%, at least 50%, at least 60%, at least 70%, at least 80%, at least 90%, at least 95%, at least 97% per weight of the first solvent. In some embodiments, drying is by exposing the composition to a temperature between 40 and 200° C. In some embodiments, drying is by exposing the composition to electromagnetic radiation in a visible and/or infrared-light spectrum.

In some embodiments, drying is by exposing the first composition in contact with the substrate to a temperature between 40 and 200° C., between 40 and 50° C., between 40 and 60° C., between 60 and 80° C., between 40 and 80° C., between 60 and 100° C., between 100 and 150° C., between 150 and 200° C., including any range or value therebetween.

In some embodiments, drying is by exposing the first composition in contact with the substrate to electromagnetic radiation in a visible and/or infrared light spectrum. In some embodiments, drying is by exposing the first composition to electromagnetic radiation having a wavelength between 400 and 2000 nm, between 400 and 600 nm, between 600 and 800 nm, between 800 and 1000 nm, between 700 and 1000 nm, between 1000 and 1500 nm, between 1500 and 2000 nm, including any range or value therebetween.

In some embodiments, drying is by exposing the composition in contact with the substrate to microwave radiation. In some embodiments, drying is performed by convection drying, such as by applying a hot gas stream to the composition in contact with the substrate. In some embodiments, drying is performed by cold drying, such as by applying a de-humidified gas stream to the surface. Generally, the drying method and exact drying conditions selected will depend upon, among other things, chemical and physical properties of materials composing the composition, and chemical and physical properties of the substrate (e.g. thermal stability).

In some embodiments, thermal curing is applied to the first composition comprising a thermally curable compound (e.g. a thermosetting polymer, as described hereinabove).

In some embodiments, UV-curing comprises exposing at least a part of the first composition, to UV or visible radiation under conditions suitable for curing at least a part of the first composition. In some embodiments, curing or UV-curing results in at least partially cured first composition.

In some embodiments, conditions suitable for curing comprise an irradiation time ranging from 0.1 to 100 seconds(s). In some embodiments, conditions suitable for curing comprise thermal exposure to a temperature between 10 and 80° C. In some embodiments, conditions suitable for curing comprise thermal exposure to a temperature between 10 and 80° C. and an irradiation time ranging from 0.1 to 100 s. In some embodiments, conditions suitable for curing comprise thermal exposure to a temperature between 10 and 60° C., between 10 and 20° C., between 10 and 25° C., between 10 and 30° C., between 20 and 30° C., between 20 and 60° C., between 20 and 50° C., between 20 and 40° C., between 25 and 40° C., between 25 and 50° C., including any range or value therebetween.

In some embodiments, conditions suitable for curing comprise an irradiation time ranging from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, including any range or value therebetween.

In some embodiments, the irradiation time is sufficient for at least partial curing or solidification of the composition. In some embodiments, the irradiation time is sufficient for at least 50%, at least 60%, at least 70%, at least 80%, at least 90%, at least 95%, at least 97%, curing or crosslinking of the composition (e.g. the first composition).

In some embodiments, curing comprises exposing the uncured composition to an electromagnetic radiation dose in a range between 50 and 400 mJ/cm$^2$, between 150 and 400 mJ/cm$^2$, between 50 and 150 mJ/cm$^2$, between 150 and 400 mJ/cm$^2$, between 200 and 400 mJ/cm$^2$, between 300 and 400 mJ/cm$^2$, including any range or value therebetween.

In some embodiments, a radiation dose required for curing is at least 100 mJ/cm$^2$, at least 150 mJ/cm$^2$, at least 200 mJ/cm$^2$, at least 300 mJ/cm$^2$, at least 400 mJ/cm$^2$ including any range or value therebetween.

Exemplary curing conditions are provided in the Examples section.

In some embodiments, a cured composition is devoid of adhesiveness. In some embodiments, a cured composition is characterized by a hardness greater than a hardness of an uncured composition. In some embodiments, a hardness a cured composition is greater than a hardness of an uncured composition by at least 20%, at least 40%, at least 60%, at least 80%, at least 100%, at least 200%, at least 300%, at least 500%, at least 1000%, at least 5000%, including any range or value therebetween.

In some embodiments, a cured composition is characterized by a cross-linking degree of the curable compound ranging from 1 to 95%, from 1 to 10%, from 1 to 5%, from 5 to 15%, from 5 to 20%, from 5 to 25%, from 10 to 30%, from 30 to 50%, from 50 to 70%, from 70 to 80%, from 80 to 95%, including any range or value therebetween.

In some embodiments, curing results in at least 10%, at least 20%, at least 40%, at least 50%, at least 70%, at least 80%, at least 90% cross-linking of the curable compound.

In some embodiments, a cured composition or a cured layer is characterized by a surface roughness in a range between 1 and 5 μm, between 1 and 3 μm, between 1 and 4 μm, between 1 and 2 μm, between 2 and 5 μm, between 2 and 3 μm, including any range or value therebetween. In some embodiments, a cured composition or a cured layer is characterized by a surface roughness less than 5 μm, less than 4 μm, less than 3 μm, less than 2 μm, less than 1 μm, including any range or value therebetween.

In some embodiments, the method comprises contacting the substrate with the second composition of the invention, wherein contacting is by any of the methods described hereinabove. In some embodiments, the method comprises contacting the first composition with the second composition, thereby patterning a metal layer on the substrate. In some embodiments, the method comprises contacting a cured first composition with the second composition, thereby patterning a metal layer on the substrate. In some embodiments, the metal layer is as described hereinbelow.

In some embodiments, the method comprises a step (iii) of contacting at least a part of the first composition with the second composition comprising a metal cation. In some embodiments, step (iii) comprises contacting at least a part of the first layer comprising the reducing agent with the second composition comprising a metal cation, wherein the reducing agent and the metal cation are as described hereinabove. In some embodiments, step (iii) comprises contacting at least a part of the cured composition with the second composition. In some embodiments, step (iii) comprises contacting at least a part of the reducing agent with the second composition comprising a metal cation. In some embodiments, step (iii) comprises contacting at least a part of the reducing agent with the second composition, under conditions suitable for patterning a metal layer on the substrate.

In some embodiments, step (iii) comprises contacting at least a part of the first layer with the second composition, thereby forming a layer comprising the second composition on top of the first layer. In some embodiments, the layer comprises the second composition in a liquid form. In some embodiments, the layer comprising the second composition is referred to as a second layer. In some embodiments, the second layer has a thickness in a range from 0.1 to 200 μm, from 0.1 to 1 μm, from 1 to 10 μm, from 5 to 15 μm, from 4 to 20 μm, from 5 to 80 μm, from 5 to 65 μm, from 10 to 80 μm, from 10 to 60 μm, from 10 to 20 μm, from 20 to 30 μm, from 30 to 40 μm, from 40 to 50 μm, from 50 to 100 μm, from 100 to 150 μm, from 150 to 200 μm, including any range or value therebetween.

In some embodiments, the second layer is at least 1 μm, at least 4 μm, at least 5 μm, at least 7 μm, at least 10 μm, at least 15 μm, at least 20 μm, at least 30 μm thick including any range or value therebetween.

In some embodiments, step (iii) comprises contacting at least a part of the first layer comprising the cured composition with the second composition comprising a metal cation, thereby inducing at least a partial diffusion of metal cations into the first layer. In some embodiments, step (iii) comprises contacting at least a part of the first layer comprising the cured composition with the second composition comprising a metal cation, thereby inducing at least a partial diffusion of the reducing compound into the second layer.

In some embodiments, the method of the invention comprises performing steps (i) and (ii) prior to performing step (iii). In some embodiments, the method of the invention comprises first performing steps (i) and (ii) to obtain the cured composition, and subsequently contacting at least a part thereof with the second composition as described hereinabove.

In another aspect of the invention, there is a method of patterning a metal layer on a substrate, wherein the substrate comprises the first composition bound or adhered thereto. In some embodiments, the substrate comprises at least partially cured first composition in contact therewith. In some embodiments, the substrate comprises at least partially cured first composition in contact therewith. In some embodiments, the substrate in contact with the cured composition comprises at least partially cured first composition bound or adhered to the substrate. In some embodiments, the substrate is a pre-treated substrate comprising the first composition in a cured form. In some embodiments, pre-treated substrate comprises the cured composition, as described hereinabove.

In some embodiments, the method comprises contacting the cured composition with the second composition under conditions sufficient for reduction of the metal cation, thereby patterning a metal layer on the substrate. In some embodiments, the method comprises contacting the cured composition with the second composition under conditions sufficient for reduction of the metal cation, wherein the cured composition is bound or adhered to the substrate. In some embodiments, the method comprises contacting the cured composition comprising the reducing agent with a second composition comprising (a) a solvent, and (b) a metal cation reducible by the reducing agent, under conditions sufficient for reduction of the metal cation, thereby patterning a metal layer on the substrate.

In some embodiments, the method comprises contacting at least a part of the first layer comprising the cured composition with the second composition comprising a metal cation, thereby inducing at least a partial diffusion of metal cations into the first layer. In some embodiments, the method comprises contacting at least a part of the first layer comprising the cured composition with the second composition comprising a metal cation, thereby inducing at least a partial diffusion of the reducing compound into the second layer.

In some embodiments, the surface roughness of the substrate (such as a cured first composition) affects a gloss level or reflectance of the metal layer. In some embodiments, reducing the surface roughness of the substrate enhances the gloss level or reflectance of the metal layer. Without being bound to any theory, the method in some embodiments thereof comprises contacting the second composition with at least a part of the substrate (such as the first layer of a cured first composition), wherein the substrate is characterized by a surface roughness of less than 2 μm, less than 1 μm. In one preferred embodiment, the surface roughness of the substrate is less than 1 μm.

In some embodiments, the method of patterning a metal layer characterized by a gloss level of more than 400 GU, more than 600 GU, more than 700 GU comprises contacting the second composition with the cured first composition under conditions sufficient for reduction of the metal cation, wherein the cured first composition has a surface roughness of less than 1 μm. In some embodiments, the cured first composition has a cross-linking degree of at least 90%, at least 95%, at least 97% including any range or value therebetween.

In some embodiments, conditions suitable for patterning a metal layer comprise conditions sufficient for reducing at least a part of metal cations. In some embodiments, conditions suitable for patterning a metal layer comprise conditions sufficient for manufacturing a plurality of atomic clusters. In some embodiments, a plurality of atomic clusters comprises reduced metal atoms. In some embodiments, a plurality of atomic clusters comprises elemental silver. In some embodiments, conditions suitable for patterning a metal layer comprise conditions sufficient for reducing at least a part of metal cations, so as to form a metal layer. In some embodiments, the term "patterning" as used herein, comprises "printing" (such as printing a metal layer).

In some embodiments, conditions suitable for patterning a metal layer comprise conditions suitable for at least partial photoreduction of the metal cations. In some embodiments, conditions suitable for patterning a metal layer comprise conditions suitable for at least partial photoreduction of metal salt crystals. In some embodiments, conditions suitable for patterning a metal layer comprise conditions suitable for at least partial photoreduction of metal cations, so as to form a metal layer comprising the metal in elemental state. In some embodiments, conditions suitable for patterning a metal layer comprise conditions suitable for at least partial photoreduction of metal cations, so as to form a metal layer characterized by a gloss level of more than 400 GU.

In some embodiments, conditions suitable for patterning a metal layer comprise exposure to electromagnetic radiation, a thermal exposure to a temperature between 25 to 250° C., or a combination thereof. In some embodiments, electromagnetic radiation comprises light (such as UV-light, visible light, or IR light), ionizing radiation (such as X-ray), LASER irradiation, electron beam, microwave or any combination thereof. In some embodiments, conditions suitable for patterning a metal layer are as described in the Examples section.

In some embodiments, electromagnetic radiation comprises UVB, UVC radiation or both. In some embodiments, electromagnetic radiation comprises UV-light at a wavelength in a range from 150 to 350 nm, from 200 to 350 nm, from 200 to 250 nm, from 200 to 300 nm, from 250 to 300 nm, from 200 to 310 nm, from 250 to 320 nm, including any range or value therebetween.

In some embodiments, a radiation dose required for reducing the metal cation is at least 5 mJ/cm$^2$, at least 10 mJ/cm$^2$, at least 15 mJ/cm$^2$, at least 20 mJ/cm$^2$, at least 30 mJ/cm$^2$, at least 40 mJ/cm$^2$, at least 50 mJ/cm$^2$, including any range or value therebetween.

In some embodiments, conditions suitable for patterning a metal layer comprise a temperature between 25 and 250° C., between 25 and 40° C., between 25 and 50° C., between 25 and 60° C., between 25 and 70° C., between 50 and 100° C., between 50 and 80° C., between 50 and 200° C., between 50 and 250° C., between 80 and 200° C., between 80 and 150° C., between 100 and 250° C., between 100 and 200° C., between 100 and 150° C., including any range or value therebetween.

In some embodiments, thermal exposure is for evaporating at least a part of the solvent of the second composition. In some embodiments, thermal exposure is for drying the second composition. In some embodiments, thermal exposure comprises a temperature sufficient for evaporating of at least 50%, at least 60%, at least 70%, at least 80%, at least 90% of the solvent, including any range or value therebetween.

In some embodiments, conditions suitable for patterning a metal layer comprise an exposure time ranging from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, including any range or value therebetween.

In some embodiments, conditions suitable for patterning a metal layer comprise exposure to electromagnetic radiation and to a temperature between 25 to 250° C.

In some embodiments, conditions suitable for patterning a metal layer comprise a molar ratio of the reducing agent of the first composition to the metal cation of the second composition being at least 1, at least 1.5, at least 2, at least 3, at least 4, at least 5, at least 6, at least 7, at least 8, including any range or value therebetween.

In some embodiments, a molar ratio of the reducing agent of the first composition to the metal cation of the second composition is at most 8, at most 7, at most 6, at most 5, at most 4, at most 2, including any range or value therebetween.

In some embodiments, conditions suitable for patterning a metal layer comprise a pH of the second composition being in a range between 5 and 8, between 6 and 7.5, between 6 and 7 including any range or value therebetween.

Without being bound to any particular theory, upon contacting the metal cations with the reducing agent, a redox reaction occurs. During the redox reaction, metal cations are reduced to their elemental state, resulting in formation of metal atoms. In some embodiments, the UV-exposure enhances formation of reduced metal atoms.

In some embodiments, steps i to iii of the method result in formation of a metal layer on the substrate, also referred to as a "second layer". In some embodiments, the second layer comprises the second composition. In some embodiments, the second layer formed by the method of the invention is bound or in contact with the cured composition. In some embodiments, the second layer is bound or in contact with the first layer, wherein the first layer and the second layer are as described hereinbelow.

In some embodiments, the method is for forming a metal layer or the second layer on the substrate, wherein the metal is in a crystalline state. In some embodiments, the method is for forming a metal layer or the second layer on the substrate, wherein the metal is in an amorphous state. In some embodiments, the method is for forming a metal layer or the second layer on the substrate, wherein at least a part of metal atoms is in an amorphous state.

In some embodiments, the metal layer or the second layer is characterized by high reflectiveness (e.g. having a gloss level of more than 400 GU) as described hereinbelow. In some embodiments, the metal layer or the second layer is characterized by a surface roughness, as described hereinbelow.

In some embodiments, the method results in impregnation of the first layer with metal atoms. In some embodiments, the method results in impregnation of the first layer is with metal cations and metal atoms. In some embodiments, the method results in impregnation of the first layer is with metal atoms, so as to form a metal layer on the outer surface of the first layer.

In some embodiments, the method results in deposition of a metal on the substrate surface. In some embodiments, the method results in precipitation of a metal on the substrate surface. In some embodiments, the method results in deposition of a metal on a surface of the first layer. In some embodiments, the method results in deposition of a metal within the first layer. In some embodiments, exposure to UV-radiation is by providing a UV-light source in operable communication with the substrate comprising any of the second layer, the second composition, the first layer, the first composition or any combination thereof. In some embodiments, a UV-light source is selected from a LED, a mercury-vapor lamp, an electric arc, a tanning lamp, and a black light.

In some embodiments, the method further comprises step (iv) of contacting the metal layer with a polymeric material, thereby forming an additional layer. In some embodiments, step (iv) comprises contacting the substrate with a polymeric material. In some embodiments, the polymeric material is a solid. In some embodiments, the polymeric material has an adhesive layer. In some embodiments, the polymeric material is in a molten state.

In some embodiments, contacting of step (iv) comprises stamping, pressing, hot stamping, printing, curing, spin casting, spin coating, spray coating, adhering, and dip coating or any combination thereof.

In some embodiments, step (iv) is for manufacturing an additional layer in contact with the substrate or with the second layer. In some embodiments, step (iv) is for manufacturing an additional layer bound or adhered to the substrate or to the second layer. In some embodiments, step (iv) is for manufacturing an outer coating layer. In some embodiments, step (iv) is for manufacturing a protective layer. In some embodiments, the additional layer is as described hereinbelow.

In some embodiments, at least a part of steps i-iv of the method are performed simultaneously. In some embodiments, steps i to iii of the method are performed simultaneously. In some embodiments, the method comprises contacting the first and the second composition with the substrate, and subsequently exposing the substrate in contact with the first and the second composition to UV-radiation, as described hereinabove. In some embodiments, the method comprises contacting a composition with the substrate, and subsequently exposing the composition to UV-radiation, wherein the composition comprises an encapsulated reducing agent and the metal cation.

In some embodiments, steps i-iv of the method are performed subsequently. In some embodiments, a subsequent step is performed upon completion of a preceding step. In one exemplary embodiment, step (iii) is performed upon completion of the preceding curing step (i.e., after exposing the first composition to UV-irradiation).

Article

In another aspect of the invention provided herein, there is an article comprising a substrate bound to a composition comprising: (a) a reducing agent, and (b) a metal, wherein the metal is in a form of a metal layer, and wherein the reducing agent and the metal are as described hereinabove. In some embodiments, the article comprises: (a) the reducing agent, the reducing agent in an oxidized form and (b) the metal in a form of a metal layer. In some embodiments, the article comprises: (a) the reducing agent, the reducing agent in an oxidized form, (b) a metal cation, and the metal in elemental state, wherein the metal is in a form of a metal layer. In some embodiments, the substrate is as described hereinabove.

In some embodiments, the article comprises one or more layer(s). In some embodiments, the article comprises at least two layers. In some embodiments, the article comprises a first layer bound to or in contact with the outer surface of the substrate. In some embodiments, the article comprises a second layer bound to or in contact with at least a part of the outer surface of the first layer. In some embodiments, the first layer is adhered to the substrate. In some embodiments, the second layer is adhered to the first layer. In some embodiments, the article comprises the first layer adhered to the substrate and the metal layer. In some embodiments, the article comprises the first layer adhered or bound to the substrate, and the metal layer adhered or bound to the first layer.

In some embodiments, a molar ratio of (i) the reducing agent and the oxidized reducing agent to (ii) the metal and the metal cation within the article is from 1 to 10, from 1.5 to 8, from 2 to 8, from 2 to 6, from 2 to 4, from 3 to 6, from 3 to 8, from 3 to 10 including any range or value therebetween.

In some embodiments, a molar ratio of (i) the reducing agent and the oxidized reducing agent to (ii) the metal and the metal cation within the article is at least 1.5, at least 2, at least 3, at least 4, at least 5, at least 6, at least 7, at least 8, including any range or value therebetween.

In some embodiments, a molar ratio of (i) the reducing agent and the oxidized reducing agent to (ii) the metal and the metal cation within the article is at most 8, at most 7, at most 6, at most 5, at most 4, at most 2, including any range or value therebetween.

In some embodiments, the first layer comprises the first composition of the invention. In some embodiments, the first layer comprises at least partially cured first composition. In some embodiments, the first layer comprises the reducing agent and the reducing agent in an oxidized form. In some embodiments, the first layer comprises the reducing agent and a curable or polymerizable compound. In some embodiments, the first layer comprises the reducing agent, the reducing agent in an oxidized form and at least partially cured UV-curable compound.

In some embodiments, the first layer comprises a dihydroxybenzene or a derivative thereof as the reducing agent. In some embodiments, the first layer comprises hydroquinone, an isomer or a derivative thereof as the reducing agent.

In some embodiments, the first layer comprises a quinone or a derivative thereof as the oxidized form of the reducing agent. In some embodiments, the first layer comprises 1,4-benzoquinone, an isomer or a derivative thereof as the oxidized form of 1,4-dihydroxybenzene.

In some embodiments, the first layer comprises an acrylate-based compound, or a vinyl-based compound as the UV-curable compound. In some embodiments, the first layer comprises any of an epoxyacrylate, an urethanacrylate, a polyesteracrylate, or any combination thereof as the UV-curable compound.

In some embodiments, the first layer further comprises a binder, a colorant, a surfactant or any combination thereof. In some embodiments, the first layer is a multicolored layer.

In some embodiments, the first layer has a thickness from 0.1 to 200 µm, from 0.1 to 1 µm, from 1 to 10 µm, from 5 to 80 µm, from 5 to 65 µm, from 10 to 80 µm, from 10 to 60 µm, from 10 to 20 µm, from 20 to 30 µm, from 30 to 40 µm, from 40 to 50 µm, from 50 to 100 µm, from 100 to 150 µm, from 150 to 200 µm, including any range or value therebetween.

In some embodiments, the terms "thick" or "thickness" including any grammatical form thereof, refer to an average thickness. In some embodiments, the thickness of any of the first or the second layer is predetermined by the amount of any of the first or the second composition applied to the substrate. In some embodiments, the thickness of any of the first or the second layer is controllable by depositing a predetermined amount of the first composition or the second composition on the substrate. In some embodiments, the thickness of any of the first or the second layer is controllable by printing a predetermined amount of the first composition or the second composition on the substrate, wherein printing is as described hereinabove.

In some embodiments, the term "layer", refers to a substantially homogeneous substance of substantially uniform-thickness.

In some cases, the first layer is characterized by a gloss between 50 and 80 GU, between 50 and 60 GU, between 55 and 70 GU, between 70 and 80 GU, between 75 and 80 GU, between 80 and 90 GU, between 90 and 100 GU including any range or value therebetween, wherein gloss is measured at 20 degrees according to ISO 2813.

In some embodiments, the first layer is characterized by adhesive strength to the substrate being in a range from 0.5-5, from 0.5-1, from 0.5-2, from 1-3, from 1-2, from 1-5, from 2-5 including any range or value therebetween, wherein the adhesive strength is measured according to ASTM adhesive test D3359.

In some embodiments, the first layer is a cured layer. In some embodiments, the first layer comprises a cured first composition as described hereinabove. In some embodiments, a first cured layer is characterized by a cross-linking degree ranging from 50 to 99%, from 60 to 95%, from 70 to 95%, from 80 to 99%, from 80 to 90%, from 80 to 95%, including any range or value therebetween. In some embodiments, the first cured layer is characterized by a surface roughness of less than 5 µm, less than 4 µm, less than 3 µm, less than 2 µm, less than 1 µm, including any range or value therebetween.

In some embodiments, the first layer is a patterned layer. In some embodiments, the first layer is in a form of a first pattern. In some embodiments, a pattern comprises any geometric form that can be patterned on a surface. In some embodiments, geometric forms are selected form the group comprising: spheres, cylinders, lamellae, rectangular prism, bicontinuous cubic or any combination thereof.

As used herein "pattern" refers to a regularly repeated arrangement, especially a design made from repeated lines or shapes on a surface. The elements of a pattern repeat in a predictable manner. In some embodiments, a pattern comprises an ornament, a decoration, or a template which can be manufactured on the substrate by the method of the invention.

In some embodiments, the pattern is a predetermined patter. In some embodiments, the predetermined pattern is according to a master-form, a digital format, or a template (such as a CAD/CAM file).

In some embodiments, the second layer comprises the second composition of the invention. In some embodiments, the second layer comprises the metal and the metal cation or a salt comprising thereof. In some embodiments, the second layer comprises the second composition of the invention and the metal in a form of the metal layer. In some embodiments, the second layer comprises the metal and optionally a curable or a polymerizable compound. In some embodiments, the second layer comprises the metal and optionally a binder. In some embodiments, the second layer comprises (i) the metal and/or the metal cation, and optionally (ii) at least partially cured UV-curable compound or a binder.

In some embodiments, the second layer comprises a metal, a metal salt or a metal cation, wherein the metal is selected from silver, gold, platinum, palladium, rhodium, nickel, zinc, and copper or any combination thereof. In some embodiments, the second layer comprises a plurality of metals.

In some embodiments, the second layer comprises any of silver, a silver salt or both. In some embodiments, the second layer is the metal layer. In some embodiments, the metal layer is a single layer. In some embodiments, the metal layer comprises a plurality of layers.

In some embodiments, the second layer is in a form of metal atoms in contact with the first layer. In some embodiments, the second layer is in a form of metal atoms in elemental state. In some embodiments, the second layer is in a form of atomic clusters of reduced metal. In some embodiments, the second layer is in a form of metal crystals. In some embodiments, metal atoms of the second layer are bound or adhered to the first layer. In some embodiments, metal atoms of the second layer are embedded within the first layer. In some embodiments, the second layer is in contact with the first layer. In some embodiments, the second layer is bound or adhered to the first layer. In some embodiments, the second layer is embedded within the first layer. In some embodiments, the first layer is impregnated with the second layer. In some embodiments, the second layer comprises metal atoms dispersed within the first layer.

In some embodiments, the second or metal layer is a uniform layer. In some embodiments, the second or metal layer is in a form of a coating. In some embodiments, the second or metal layer comprises metal atoms in a crystalline state. In some embodiments, the second or metal layer comprises metal atoms in an amorphous state. In some embodiments, the second or metal layer is substantially devoid of any particulate matter. In some embodiments, the second or metal layer is substantially devoid of metal nano-particles (such as in a range from 10 to 1000 nm).

In some embodiments, the second layer further comprises a binder, a colorant, a surfactant or any combination thereof. In some embodiments, the second layer is a multicolored layer.

In some embodiments, the metal layer has a thickness from 0.1 to 200 nm, from 0.1 to 1 nm, from 0.1 to 10 nm, from 1 to 10 nm, from 10 to 20 nm, from 20 to 30 nm, from 30 to 40 nm, from 40 to 50 nm, from 50 to 100 nm, from 100 to 150 nm, from 150 to 200 nm, including any range or value therebetween.

In some embodiments, a dried second layer has a thickness from 0.1 to 200 nm, from 0.1 to 1 nm, from 0.1 to 10 nm, from 1 to 10 nm, from 10 to 20 nm, from 20 to 30 nm, from 30 to 40 nm, from 40 to 50 nm, from 50 to 100 nm, from 100 to 150 nm, from 150 to 200 nm including any range or value therebetween, wherein the dried second layer as used herein refers to a layer of the second composition in a solid state substantially devoid of the second solvent.

In some embodiments, the terms "thick" or "thickness" including any grammatical form thereof, refer to an average thickness.

In some embodiments, the second layer is characterized by a surface roughness of less than 5 µm, less than 4 µm, less than 3 µm, less than 2 µm, less than 1 µm, including any range or value therebetween.

In some embodiments, the second layer is characterized by a surface roughness substantially identical with the surface roughness of the first layer. In some embodiments, surface roughness of the second layer is predetermined by the surface roughness of the first layer. In some embodiments, a gloss level of the second layer is predetermined by the surface roughness of the first layer.

In some embodiments, the second layer is characterized by a gloss level greater than 400 GU, greater than 500 GU, greater than 600 GU, greater than 700 GU, greater than 900 GU, including any range or value therebetween, wherein the gloss level is measured at 20 degrees according to ISO 2813.

In some embodiments, the second layer is stable at a temperature between −100 to +100° C., between −100 to −50° C., between −50 to 0° C., between 0 to 400° C., between 0 to 50° C., between 0 to 60° C., between 0 to 70° C., between 0 to 100° C., between 20 to 70° C., between 20 to 80° C., between 20 to 100° C., including any range or value therebetween.

As used herein the term "stable" refers to the capability of the layer to maintain its structural and/or mechanical integrity. In some embodiments, the layer or the layered composition is referred to as stable, if the layer substantially maintains its pattern. In some embodiments, the layer is referred to as stable, if the layer substantially maintains its gloss.

In some embodiments, the second layer is a patterned layer. In some embodiments, the second layer is in a form of a second pattern. In some embodiments, the first pattern and the second pattern are substantially identical. In some embodiments, the first pattern and the second pattern are substantially different. In some embodiments, the pattern is as described hereinabove.

In some embodiments, the article comprises and additional layer. In some embodiments, the additional layer is in a form of a coating. In some embodiments, the coating is a protective coating. In some embodiments, the additional layer is substantially impermeable to oxidizing gas molecules, such as oxygen, sulfur oxides, nitrogen oxides or any combination thereof. In some embodiments, the additional layer is substantially impermeable to UV and/or visible light.

In some embodiments, the additional layer is in a form of a coating selected from: an anti-fouling coating, an anti-corrosion coating, a heat resistant coating, a superhydrophobic coating, a lyophobic coating, an anti-abrasive coating, and a self-cleaning coating or any combination thereof.

In some embodiments, the additional layer comprises any of: the first composition, the second composition, an additive (such as a colorant, a pigment or a dye), or any combination thereof.

In some embodiments, the article is manufactured by any of the methods described herein.

General

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

As used herein, the term "substantially" refers to at least 80%, at least 85%, at least 90%, at least 92%, at least 95%, at least 96%, at least 97%, at least 98%, at least 99%, including any range or value therebetween. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Conditions for Patterning a First Layer

The first composition utilized for printing the first layer comprises an acrylate-based UV-curable agent and hydroquinone as reductant. The first composition comprises:

| Compound | w/w concentration (in %) |
|---|---|
| Dipropylene glycol diacrylate | 40 |
| Isobornyl Acrylate | 12 |
| Ethoxylated trimethylolpropane triacrylate | 15 |
| Polyester acrylate, e.g. Ebecryl 83 | 20 |
| Diphenyl(2,4,6-trimethylbenzoyl) phosphine oxide | 5 |
| 1-hydroxycyclohexy phenylketone, e.g. Irgacure 127 (photoinitiator) | 3 |
| Hydroquinone | 4 |
| TegoRad N2200 (silicone-based surfactant) | 1 |

In an exemplary embodiment, the first composition has a surface tension in a range from 20 dyne/cm to 24 dyne/cm at 25° C.

The first layer is printed by applying a first composition to a substrate, using an ink jet press (such as Scodix Ultra) equipped with Ricoh Gen 4 printheads. The first layer was about 40 μm thick. The printed first layer was subsequently cured by irradiation with a medium-pressure (MP) UV lamp (2×240 W/cm, mercury lamp) at 16 m/min.

Example 2

Conditions for Patterning a Metal Layer

The second composition utilized for printing of the second layer comprises a solvent and a metal salt, as set forth below. The second composition comprises:

| Compound | w/w concentration (in %) |
|---|---|
| Water deionized | 34 |
| Propylene glycol | 50 |
| Silver nitrate | 15 |
| BYK 349 (silicone-based surfactant) | 1 |

In an exemplary embodiment, the second composition has a surface tension in a range from 20 dyne/cm to 24 dyne/cm at 25° C.

The process of patterning a metal layer comprises first printing the first layer on a substrate as described in Example 1 and subsequently printing a second layer on top of the first layer by a homemade printing apparatus comprising Ricoh Gen 4 printheads. The resulting second layer (in a liquid form) was about 12 μm thick. Then, the substrate comprising the second layer on top of the first layer was exposed to UV irradiation using a MP UV lamp as a UV-light source (1×40 W/cm, mercury lamp) and subsequently dried by hot air flow (200° C., 10 s). Highly reflective, mirror-like pattern having a gloss level of 760 GU was obtained.

In order to examine the effect of the UV exposure on the formation of the metal layer, a comparative experiment was performed. The second composition was deposited on top of the first layer, according to the procedure described hereinabove. Subsequently, the second layer was dried by applying a hot air flow (200° C., 10 s), however the resulting layer was not exposed to UV radiation. The obtained metal layer was characterized by poor reflectiveness and lacked any metallic glance. The gloss level of the unexposed metal layer was calculated to be about 240 GU. The gloss level was determined according to ISO 2813 at 20° C. Therefore, it is preferential to expose the second layer to UV-radiation to obtain a metal layer having a gloss level of more than 400 GU.

Example 3

Effect of the UV Irradiation Wavelength

The second layer is printed on top of the first layer according to the method described in Example 2, however the irradiation after applying the second layer was performed at 395 nm by a UV LED (15 W/cm2, 16 m/min). The resulting film was characterized by poor reflectiveness and a non-metallic appearance. The gloss level of the second layer was calculated to be about 240 GU. The gloss level was determined according to ISO 2813 at 20° C. Thus, current Example 3 points out the importance of using a UV light at a wavelength in a range between 150 and 350 nm.

Example 4

Effect of Using a Water-Based First Composition for Manufacturing of the First Layer To verify the effect of a water-based composition for use in the manufacturing of the first layer, an aqueous composition comprising a reducing agent and a binder was prepared. An exemplary water-based first composition comprises:

| Compound | w/w concentration (in %) |
|---|---|
| Joncryl 8050-E (an acrylic binder) | 15 |
| Water | 79 |
| Hydroquinone | 5 |
| BYK 349 (silicone-based surfactant) | 1 |

The first composition was applied on a paper substrate (Chromomat) by a 24 μm drawdown rod. Then the paper was placed in an oven heated to 65° C. for drying. Subsequently, the second composition from Example 2 was applied on top of the first layer by a 12 μm drawdown rod. The coated substrate was irradiated by MP UV lamp (1×240 W/cm, mercury, at 60 m/min) and then dried by hot air flow (200° C., 10 seconds). The resulting layer had a metallic appearance, however the gloss level of the second layer was only about 20 GU. The gloss level was determined according to ISO 2813 at 20° C. Such a low reflectance is possible due to elevated surface roughness of the first layer, as a consequence of highly non-uniform surface structure of the paper substrate. Therefore, it is preferential to use a curable composition as described in Example 1.

Example 5

Effect of Reversing the Order of Steps on the Resulting Metal Layer

The second composition of Example 2 was applied on a paper substrate (Chromomat) by a 14 μm drawdown rod. Then, the paper was dried by a hot air, to form a first layer on the substrate. The composition of Example 1 was applied on top of the first layer by a 40 μm drawdown rod. The coated substrate comprising the first and the second layers was then irradiated by MP UV lamps (3×240 W/cm, mercury, at 60 m/min). No metallic appearance was obtained.

Without being bound to any particular theory or mechanism, it is assumed that the second layer was non-penetrative to UV-light, and therefore the UV irradiation failed to induce the reduction of silver cations. Another possible explanation for this observation, without being bound to any particular theory or mechanism, is that the silver cations of the first layer are in a solid form lacking any substantial mobility and thus cannot diffuse into the second layer, so as to be reduced by the reducing agent. Consequently, the metallic layer is not formed, and the outer surface of the printed substrate lacks any substantial metallic appearance and reflectiveness. Current example points out the importance of performing the manufacturing process according to the step order, as described in Example 2.

What is claimed is:
1. A method for patterning a metal layer on a substrate, comprising:
(i) providing a substrate in contact with a cured composition comprising a reducing agent; and
(ii) contacting said cured composition with a metal cation solution wherein the metal cation is reducible by said reducing agent and applying conditions sufficient for reduction of the metal cation by said reducing agent, wherein said conditions comprise exposure to UV-light; and wherein said contacting is performed in one-step;
thereby patterning said metal layer on said substrate, wherein said metal layer is characterized by a gloss greater than 400 GU.

2. The method of claim 1, wherein said conditions comprise a temperature between 50 and 250° C.

3. The method of claim 1, wherein said UV-light comprises light at a wavelength between 150 to 350 nm.

4. The method of claim 1, wherein said contacting is by a process selected from the group consisting of: printing, spin casting, spin coating, spray coating, and dip coating, or any combination thereof.

5. The method of claim 4, wherein said printing is selected from the group consisting of digital printing, spray printing, flexography, and ink jet printing, or any combination thereof.

6. The method of claim 1, wherein the metal cation solution has a viscosity between 1 and 100 cP.

7. The method of claim 1, wherein the cured composition comprises at least partially cross-linked UV-curable compound.

8. The method of claim 7, wherein said UV-curable compound comprises an unsaturated bond.

9. The method of claim 7, wherein said UV-curable compound comprises an acrylate-based compound, a vinyl-based compound or both, and wherein the acrylate-based compound is selected from the group consisting of: epoxyacrylates, urethaneacrylates, and polyesteracrylates, or any combination thereof.

10. The method of claim 1, wherein said exposure to UV-light comprises exposure time between 0.1 and 100 seconds.

11. The method of claim 1, wherein said reducing agent is selected from the group consisting of: 1-phenyl-3-pyrazolidinone, sodium tetrahydroborate, citric acid, ascorbic acid, formic acid, hydrazine, dihydroxybenzene, catechol, resorcinol, hydroquinone, methylhydroquinone, tert-butylhydroquinone, di-tert-butylhydroquinone, ubiquinol, an aminophenol, and a phenylenediamine, including any combinations, salts, or derivatives thereof.

12. The method of claim 1, wherein said reducing agent comprises a dihydroxybenzene or a derivative thereof, and wherein said dihydroxybenzene comprises hydroquinone.

13. The method of claim 1, wherein said metal is selected from the group consisting of: silver (Ag), gold (Au), palladium (Pd), platinum (Pt), copper (Cu), rhodium (Rh) tungsten (W), titanium (Ti), zirconium (Zr), hafnium (Hf), tin (Sn), gallium (Ga), molybdenum (Mo), vanadium (V), tantalum (Ta), germanium (Ge) and Niobium (Nb), or any combination thereof.

14. The method of claim 1, wherein said substrate in contact with said cured composition is manufactured by: (i) contacting a substrate with a first composition comprising said reducing agent and a UV-curable compound, to obtain said substrate in contact with said first composition; and (ii) exposing said substrate in contact with said first composition to UV-light, thereby curing said first composition.

15. The method of claim 14, wherein any of said first composition and said metal cation solution further comprise a photoinitiator, a colorant, and a binder, or any combination thereof.

16. The method of claim 1, wherein said metal layer comprises Ag.

17. The method of claim 1, further comprising step (iii) of contacting said metal layer or said substrate with a polymeric material, thereby forming an additional layer.

18. The method of claim 1, wherein said metal layer is between 0.1 to 100 nm thick.

19. The method of claim 1, wherein the metal within said metal layer is in a crystalline state.

20. A method for patterning a metal layer on a substrate, comprising:
   (i) providing a substrate in contact with a cured composition comprising a reducing agent; and
   (ii) contacting said cured composition with a metal cation solution wherein the metal cation is reducible by said reducing agent, and applying conditions sufficient for reduction of the metal cation by said reducing agent, thereby patterning said metal layer on said substrate;
   wherein:
   said metal layer is characterized by a gloss greater than 400 GU;
   said conditions comprise exposure to UV-light and to a temperature between 50 and 250° C.;
   said contacting is performed in one-step; and
   said reducing agent comprises a dihydroxybenzene or a derivative thereof.

* * * * *